Feb. 18, 1964  J. D. BERING  3,121,444
BALANCED VALVES
Filed July 13, 1960
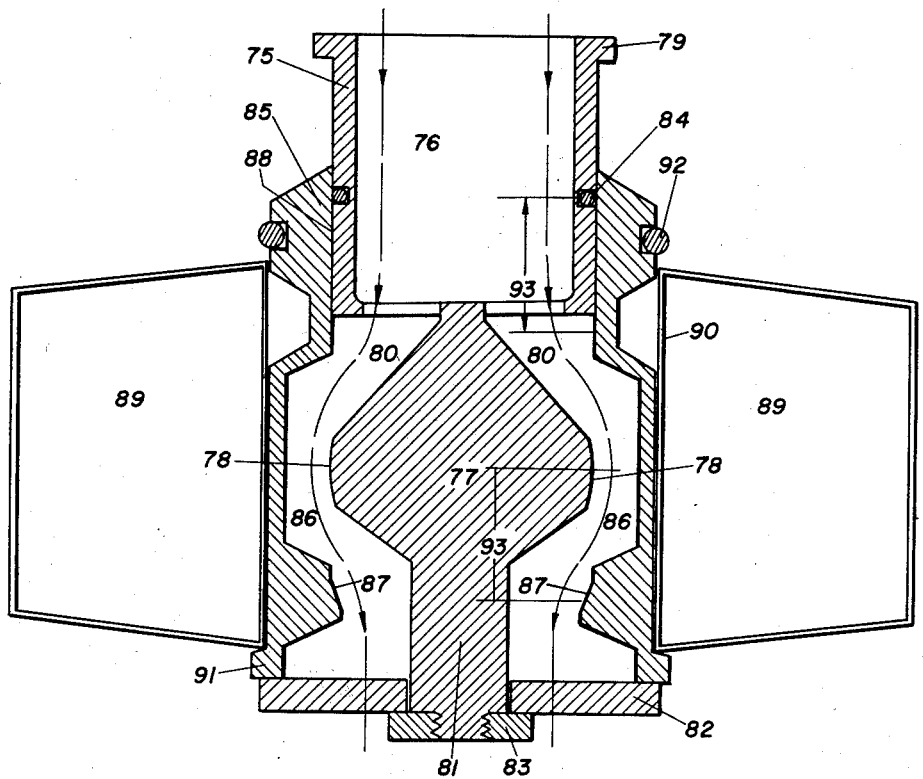
INVENTOR
*JORGEN DIETZ BERING*

# 3,121,444
BALANCED VALVES
Jorgen Dietz Bering, Fairfax, Calif.
Filed July 13, 1960, Ser. No. 42,641
5 Claims. (Cl. 137—432)

This invention relates to valves used in the control of liquid flow. The operation of such valves is at times exposed to disturbances caused by the line pressure of the liquid. It is the object of my invention to provide efficient valves resistant to disturbances of this nature. It is furthermore the object of my invention to provide design for such disturbance resistant valves that can be made in stainless steel and used in sanitary and corrosive-resistant operation when open flow, complete drainage, ready assembly and absence of cavities are factors of importance.

The work load on the means for operating valves of this type consists of the mechanical load of moving the stem plate in and out of closing position; exerting sufficient pressure, when needed, in closed position to make proper sealing; and overcoming the effects of the line pressure and the kinetic action of the liquid flow upon the stem movement. In many cases there are suitable means for the operation of the valve—such as turning, threaded or leverage arrangements—that are capable of dealing adequately with these functions. But there are usages of valves in which the available means for operation do not properly curb the effects of the line pressure. Disturbing effects upon the action of the valve may result.

These disturbances tend to occur when the valve is moved back or forth through near-closing ("cracked") to closed position. If the direction of the liquid flow is parallel with that of the stem movement toward closing position there is a tendency to a final jolting closure that may shake the line or damage the seat. The opening of the valve, performed against the larger static pressure on the intake side of the valve may require a substantial initial pull and cause a jolting opening action. The final closing of the valve may also become affected by kinetic action of the liquid flow, augmented by the increase in velocity as the orifice is being restricted toward the closure of the valve. The result is often an oscillating and clattering effect which on occasion may block the closure of the valve altogether.

Among the types of valve operation that are particularly vulnerable to line pressure disturbances of this nature are: Straight-line stem activation, as often required in "automated" operation; float valves operating in restricted space when only limited power for stem activation is available; regulating valves that tend to be operated in "cracked" or nearly-closed position; sanitary or corrosive-resistant operation when only special valve design becomes acceptable; and generally in valves that are made of stainless steel.

The extreme sensitivity of stainless steel valves (or valves of seating and sealing parts in stainless steel) to line pressure disturbance seems related to the unique surface character of this material which includes the so-called "galling" effect, or resistance to mobile area contact between parts made of this material. Any unbalanced or jolting valve action which invites violent area contact between stem and housing will tend to cause sticking of the valve and severe damage to the contacting surfaces. Once brought into a "cocked," or locked-unaligned position by jolting action, a valve in stainless steel will tend to "grab" or remain locked and exposed to cutting action. A phase of my invention is specifically concerned with the elimination of jolting action from line pressure disturbances and damage of this source to valves of stainless steel.

Other features of valves incorporating the design of my invention are open flow, absence of pockets, complete drainage, and a simplicity in structure that lends itself to execution in stainless steel and usage in sanitary and corrosive resistant operation.

In the example of valves of my invention in the drawing, the balancing of the lines pressures takes the form of equalizing the hydrostatic pressures acting upon the valve in closed position. The related effect on the operation in open position seems to be one of smoothly approaching a balanced state as the valve closes, versus a jolting action toward an ultimately unbalanced condition.

For smooth action and effective closure, and especially in view of the hazards related to stainless steel area contact, my invention comprises these specifications for the seating and sealing means: the seating should be obtained by a spherical stem section rendering line contact with a seating port in the housing which includes a cone section of an angle of not over 60 degrees with the axis of the seating port; in case of the means for mobile sealing the diametrical clearance between the cylindrical stem section and the bore of the cylindrical housing port should be no less than .010".

As mentioned, my invention is of particular importance in case of certain types of valve operation, but its significance is not limited to them. In general the elimination of the line pressure effect upon the operation, with the related means for seating and sealing and the resulting simplification in construction, make possible novel and effective valve designs for various purposes.

The disturbing effects of line pressure upon valve operation tends to come from three sources, namely (1) the incoming line pressure; (2) the line pressure on the discharge side, referred to as the back pressure; and (3) the liquid pressure of the interior of the valve as it affects the stem when it connects with a rod through an orifice with the exterior of the valve, and here referred to as the stem rod effect.

For complete elimination of the effects of line pressure on the operation of the valve all of these three categories must be covered. However, the stem rod effect or the back pressure is frequently minor or nil, and in that case there may be little or no need for the elimination of their effect. My invention therefore includes its embodiment both in designs of complete elimination of line pressure effect, and in designs of greater simplicity without means for the elimination of the stem rod effect or the back pressure effect or both.

Other objects and advantages of the invention will appear from the following specification in which reference is made to the accompanying drawing, FIG. 1, which is a vertical midsectional view through a valve which is symmetric about its vertical central axis.

The drawing shows a straight flow valve embodying the structure of my invention and likewise designed for usage as a float valve for open discharge with no back pressure effect.

This valve may be made in any suitable metal or plastic product resistant to the materials to which it may be exposed. In metal, stainless steel is often preferable, at least for the seating and mobile sealing sections, and in this case, as already mentioned, the following specifications are part of my invention: The seating should be performed in linear fashion by means of a sperical stem part and a matching seating port comprising a conical section of an angle of no more than 60 degrees with the axis of the port, as shown in detail in the drawing. The diametrical clearance between the cylindrical stem section and the bore of the housing port should be no less than .010" to assure smooth closure without tendency for binding and damage to the seating and moving parts.

As mentioned, float valves which usually discharge into atmospheric conditions, are highly sensitive to line pressure disturbances since they are often operated in partly or nearly closed position, moved by the limited power provided by the weight versus the buoyancy of a hollow body, and restricted by confining dimensions within a tank.

The drawing shows a float valve which beyond the previously mentioned features of my invention provide other features desirable in certain types of liquid level control, such as straight downward vertical flow with open end discharge substantially below the operating liquid level, short stroke, and direct and parallel action of the float upon the valve movement. This float valve is specifically suited for level control in rotating filler bowls with vertical center inlet. As is generally the case with valves of this function, it is highly sensitive to line pressure disturbances, and means for their elimination are essential for competent operation.

The drawing shows the float valve in open position. The mobile housing 85 can be lifted to seating closure against the stationary stem 75 by the action of float 89.

The stationary stem 75 comprises an upper tubular section 76 which upwardly ends in the union part 79 for connection with an inlet line, and which has an exterior groove for containment of the packing ring 84 that provides mobile liquid sealing over the stroke (93) of the valve against the bore of the upper housing section 88. Downwardly the tubular section 76 ends in several ports 80 that lead to the center section 86 of the housing 85, and below which follows a solid section 77 that includes the seating section 78. The solid section is extended downward by the rod 81 which at its end carries the bar 82 (held in place by the nut 83) which stops and carries the housing 85 when the valve is in completely open position.

The mobile cylindrical housing 85 comprises a center section 86 of sufficient orifice to allow free liquid passage around the stem section 77. Downward it leads through seating port 87 to open discharge, while upward it extends into a cylindrical section 88 of the same orifice as the seating port and of sufficient length to assure mobile sealing contact with the packing ring 84 through the stroke 93 of the valve. As to the exterior of the housing 85, it ends downward in a flange 91, and near the upper end it shows a groove for containment of the float locking ring 92.

The volume of the hollow disc-shaped float 89 with center bore provides a net buoyancy which is sufficient to lift the mobile housing 85 up against the stationary stem 75 and assure proper closure between the seating port 87 and seating section 78 of the stem. The float is attached to the housing between the flange 91 and the lock ring 92.

In an empty tank the valve will in vertical position remain open as the housing 85 attached to the float 89 with the combined weight of the two parts is resting on the bar 82, and the seating port 87 is pulled away from the seating section 78 of the stem, as shown in the drawing. If liquid from the inlet line pours through the valve and into the tank the buoyancy of the float will eventually close the valve and the liquid in the tank will reach its maximum level. If simultaneous drainage from the tank takes place the valve will tend to seek a partly open position of sufficient discharge orifice to supply liquid at the rate of the drainage and thus maintain a constant operating level.

Following the structure of my invention the effect of the hydrostatic line pressure on the valve in closed position is balanced and eliminated by the exertion of equal pressures upon equal areas in opposite directions—in this case upon the surface surrounding seating port 87 and the area of the surface surrounding upper cylindrical section 88 of the housing, and opposed by identical atmospheric pressure at either end of the housing. The result is smooth and dependable operation of the valve.

Any adjustment by discrepancy in area between the two surfaces of the stem for the purpose of improving the sealing of the valve should in this design take the form of a relative increase in the area of the surface surrounding cylindrical housing section 88 in excess of the area of the surface surrounding seating port 87. This adjustment should remain minor and not exceed 10% of the total orifice.

The movement of the mobile housing 85 in relation to the stationary stem 75 between open and closed position of the valve may be performed by other means than the float arrangement just described, and in general the valve may be used in open discharge and drainage.

Having thus described my invention, I claim:

1. A liquid valve comprising a stem having a hollow central portion, an inlet tube at one end of said stem opening into said hollow central portion, side discharge ports opening laterally from said central portion, and a solid plug section on the end of said stem opposite said inlet tube; a hollow valve body having a central section enclosing said plug section having clearance for liquid passage around said plug section and also formed at one end with a valve seat cooperable with said plug to form a liquid tight seal, said body formed at its end opposite said seat with a cylindrical port in liquid tight engagement with said inlet tube of said stem, the cross-sectional area of said inlet tube and of said body surrounding said valve seat being substantially equal; and a float fixed to said hollow valve body controlling opening up said valve dependent upon the level of liquid in which said valve is immersed, whereby said float causes movement of said hollow valve body relative to said stem for opening and closing movement of said valve balanced against line pressure in said inlet tube.

2. A balanced liquid valve comprising a stationary member and a movable member, said stationary member having an inlet pipe terminating in an inlet port and a stem section depending below said inlet port, said stem section having an enlarged cross-section portion below said inlet port of greater cross-section than the interior of said inlet pipe and a seating section below and of lesser cross-section than said enlarged cross-section portion, said seating section having substantially the cross-section of said inlet port, said movable member being hollow and having a central section of substantially greater cross-section than said enlarged cross-section of said stem section, an upper portion above said central section fitting around said inlet pipe, seal means sealing said upper portion to said inlet pipe with an axially slidable fit, a lower portion below said central section formed with a seat cooperable with said seating section of said stem section to close said valve, and a float fixed for movement with said movable member to move said valve between open and closed positions depending upon the level of liquid in which said float is immersed.

3. A valve according to claim 2, in which said seat is formed as a surface of revolution about an axis parallel to the direction of relative reciprocation of said body and said plug and being conical and said plug is formed with a seating section cooperable with said seat to close said valve formed as a surface of revolution about said axis and being a spheroidal section, the angle between the side of said conical section of said seat and said axis being not greater than 60°.

4. A valve comprising a hollow valve body and a valve plug in said body, means operatively connected to said body to move said body vertically while said plug is stationary for opening and closing of said valve; said body having an inlet port, an outlet port and a valve seat intermediate said ports; an inlet pipe extending through said inlet port, means restraining vertical movement of said inlet pipe, said inlet pipe transmitting inlet pressure to the interior of said valve body and to at least a portion of said plug on the inlet side of said outlet port; said valve seat having a configuration converging toward said outlet port, said plug having a configuration diminishing toward said outlet port, said body and said inlet pipe cooperating to guide said plug into said seat as said valve approaches closed position, said plug and seat being of stainless steel and meeting substantially in a circular line of contact around said seat; the interior of said body shaped to provide in closed position of said valve substantially equal and opposed areas subject to inlet pipe pressure to balance said valve against inlet pressure.

5. A valve according to claim 4, which further comprises a float connected to said body, said inlet pipe being parallel to said axis and movable relative to said body and means mounting said plug stationary relative to said pipe.

References Cited in the file of this patent

UNITED STATES PATENTS

| | | |
|---|---|---|
| 430,089 | Sewall | June 10, 1890 |
| 923,413 | Davis | June 1, 1909 |
| 1,519,856 | Lorraine | Dec. 24, 1924 |
| 1,649,953 | Ernst | Nov. 22, 1927 |
| 2,122,866 | Lippold | July 5, 1938 |
| 2,416,787 | White | Mar. 4, 1945 |
| 2,590,466 | Rued | Mar. 25, 1952 |
| 2,715,415 | Tucker | Aug. 16, 1955 |
| 2,935,995 | Rucker | May 10, 1960 |
| 2,995,337 | Tanner | Aug. 8, 1961 |